(12) United States Patent
Itomi

(10) Patent No.: US 7,928,726 B2
(45) Date of Patent: Apr. 19, 2011

(54) ROTATION SENSOR UNIT

(75) Inventor: Shoji Itomi, Kuwana (JP)

(73) Assignee: NTN Corporation, Osaka (JP)

( * ) Notice: Subject to any disclaimer, the term of this patent is extended or adjusted under 35 U.S.C. 154(b) by 142 days.

(21) Appl. No.: 12/408,867

(22) Filed: Mar. 23, 2009

(65) Prior Publication Data

US 2009/0243600 A1 Oct. 1, 2009

(30) Foreign Application Priority Data

Mar. 25, 2008 (JP) .................................. 2008-078007

(51) Int. Cl.
*G01B 7/30* (2006.01)
(52) U.S. Cl. ................... 324/207.25; 324/174
(58) Field of Classification Search .......... 324/173–174, 324/207.25; 73/514.31, 514.39
See application file for complete search history.

(56) References Cited

U.S. PATENT DOCUMENTS

| | | | | |
|---|---|---|---|---|
| 5,497,081 A * | 3/1996 | Wolf et al. | ................ | 324/207.12 |
| 5,829,889 A * | 11/1998 | Kerr et al. | ..................... | 384/446 |
| 6,291,990 B1 * | 9/2001 | Nakane et al. | ........... | 324/207.25 |
| 2006/0239597 A1 * | 10/2006 | Mizutani et al. | ............... | 384/446 |
| 2009/0123098 A1 * | 5/2009 | Takahashi | ..................... | 384/448 |
| 2010/0225307 A1 * | 9/2010 | Takahashi | ................ | 324/207.25 |

FOREIGN PATENT DOCUMENTS

| | | | |
|---|---|---|---|
| JP | 3086563 | | 9/2000 |
| JP | 2007248105 A | * | 9/2007 |
| WO | WO 2004113751 A1 | * | 12/2004 |
| WO | WO 2007105366 A1 | * | 9/2007 |

\* cited by examiner

*Primary Examiner* — Bot L LeDynh
(74) *Attorney, Agent, or Firm* — Wenderoth, Lind & Ponack, LLP.

(57) ABSTRACT

A rotation sensor unit includes an encoder, a holder radially positioning the encoder, and a rolling bearing having an inner race. The rolling bearing is fitted around the shaft so that one end of the inner diameter surface of the inner race protrudes from the end of the outer diameter surface of the shaft. The holder has a screwed portion fitted in the inner race, positioning the encoder coaxially with the shaft. The holder is nonmagnetic, having a retaining portion in which the encoder is axially pressed. The encoder is a plastic magnet, with protrusions and recesses formed integrally on its outer diameter surface and biting the inner diameter surface of the retaining portion to prevent the encoder from rotating. With the holder screwed to the shaft, the encoder is disposed between the magnetism detection element and the one end of the shaft.

6 Claims, 2 Drawing Sheets

ROTATION SENSOR UNIT

BACKGROUND OF THE INVENTION

This invention relates to a rotation sensor unit that detects rotation of a shaft with a magnetic encoder.

As a rotation sensor unit of this type, a rotation sensor unit comprising a rolling bearing having an outer race, a housing in which the outer race of the rolling bearing is fitted, a shaft supported by the rolling bearing and a magnetic encoder for detecting rotation of the shaft is widely used. The encoder of the magnetic encoder should be a magnet having north and south poles provided alternately in the circumferential direction around the axis of the shaft. The encoder is provided coaxially with the shaft so that it rotates integrally with the shaft. The magnetism detection element of the magnetic encoder is provided so that it axially faces the encoder. The area of each surface of the encoder and the magnetism detection element facing axially with each other is much smaller than the area of the end surface of the shaft, and therefore it is essential to stabilize the rotation center of the encoder for high accuracy of detection.

Japanese Patent Publication 3086563B discloses a conventional rotation sensor unit comprising a shaft formed with a recess in one end surface thereof, and an encoder fitted in the hole so that the encoder is positioned coaxially with the shaft. The shaft is made of a non-magnetic material so that flux from the encoder to the magnetism detection element is not caught by the shaft.

SUMMARY OF THE INVENTION

However, for the rotation sensor unit of JP 3086563B, a machining process is required to form the recess in the shaft in which the encoder is fitted. Also, the material of the shaft of the rotation sensor unit of JP 3086563 is limited to non-magnetic materials.

An object of this invention is to provide a rotation sensor unit wherein the encoder can be positioned coaxially with the shaft without forming a hole in the shaft to fit the encoder therein.

This invention provides a rotation sensor unit comprising a rolling bearing having an outer race and an inner race, a housing in which the outer race of the rolling bearing is fitted, a shaft supported by the rolling bearing, a magnetic encoder for detecting rotation of the shaft, the magnetic encoder having an encoder and a magnetism detection element, the encoder being a magnet comprising north and south poles provided alternately in a circumferential direction around an axis of the shaft and rotatable coaxially and integrally with the shaft, the magnetism detection element axially facing the encoder, and a holder provided to position the encoder radially, the inner race of the rolling bearing having an inner diameter surface fitted around the shaft with one end thereof protruding from an end of an outer diameter surface of the shaft, wherein the encoder is positioned coaxially with the shaft by fitting the holder to the inner diameter surface of the inner race at the one end thereof.

According to this invention, since the one end of the inner diameter surface of the inner race protrudes from the end of the outer diameter surface of the shaft, the holder retaining the encoder can be fitted to this end of the inner diameter surface of the inner race, and the encoder can be positioned radially via the holder. The inner diameter surface of the inner race fitted to the shaft is considered to be coaxial with the shaft. The holder can therefore be positioned coaxially by fitting as described above. The position of the encoder can be predetermined so that it becomes coaxial with the shaft when the encoder is fitted in the holder. The encoder can thus be positioned coaxially with the shaft by fitting the holder to the end of the inner diameter surface of the inner race.

As described above, this invention utilizes the end of the inner diameter surface of the inner race to position the encoder, and the encoder can be positioned coaxially with the shaft without forming a hole in the shaft to fit the encoder therein.

The following is the description of various arrangements of this invention. In the rotation sensor unit according to a first arrangement, the holder is made of a non-magnetic material.

Flux from the encoder to the magnetism detection element is not caught by the holder. Therefore in the rotation sensor unit according to the first arrangement, positioning the encoder radially with the holder does not adversely affect the magnetic field formed by the encoder.

In the rotation sensor unit according to a second arrangement, the holder has a retaining portion that retains the encoder and a screwed portion that extends between the retaining portion and the one end of the inner diameter surface of the inner race, and the screwed portion and the shaft are fixed to each other with non-magnetic screw members.

The holder can be fixed to the shaft by screwing. The screwed portion and the screw members are provided between the retaining portion that retains the encoder and the end of the inner diameter surface of the inner race. Using non-magnetic materials for the screwed portion and the screw members, flux from the encoder to the magnetism detection element is not caught by the screwed portion or the screw member. Therefore in the rotation sensor unit according to the third arrangement, screwing the holder to the shaft does not adversely affect the magnetic field formed by the encoder.

In the rotation sensor unit according to a third arrangement, the encoder is fixed in a position between the magnetism detection element and the first end of the shaft.

By fixing the encoder in a position between the magnetism detection element and the one end of the shaft, flux from the encoder to the side of the magnetism detection element is not caught by the shaft. Therefore in the rotation sensor unit according to the third arrangement, a magnetic material can be used for the shaft.

The rotation sensor unit according to a fourth arrangement has a lid closing an open end of a bearing mounting slot of the housing, wherein the lid is pressed axially against the outer race to apply a preload to the bearings, wherein the magnetism detection element is positioned on the lid on the side facing the first end of the shaft, wherein the lid, the shaft and the outer race are made of magnetic materials, and wherein the magnetism detection element is provided in a magnetically shielded space defined by the lid, the first end of the shaft, and the outer race.

Preload to a rolling bearing increases the rigidity of the roller bearing, and prevents run-out of the shaft. Since the encoder is provided and rotated coaxially and integrally with the shaft in which run-out is prevented, relative displacement between the magnetism detection element and the encoder is prevented. Further, the space between the lid and the end surface of the shaft on the first side is surrounded by the lid and the outer race. This makes it possible to define a magnetically shielded space by using magnetic materials for the lid, the shaft and the outer race. The magnetism detection element fixed to the lid on the side facing the end of the shaft on the first side can be provided in the magnetically shielded space. Thus in the invention according to the fourth arrangement, the magnetism detection element can be shielded from an external magnetic field without recourse to an additional magnetically shielded cover or the housing. This makes it possible to reduce the number of parts of the sensor unit and make the unit compact.

In the rotation sensor unit according to a fifth arrangement, the holder is made of a synthetic resin and retained by being pressed in the inner diameter surface of the retaining portion, protrusions and recesses being formed on the outer diameter surface of the encoder so as to bite the inner diameter surface of the retaining portion to prevent the encoder from rotating relative to the holder.

Simply by pressing the encoder into the retaining portion of the holder in the axial direction, the retainer can be radially held in position. If this retaining portion is non-magnetic, the retaining portion can be made of a synthetic resin. If the retaining portion is made of a synthetic resin, the holder can be formed by integral injection molding. But in this case, interference between the encoder and the retainer decreases with time because of creep of the synthetic resin. Since the shaft and the encoder are required to rotate integrally in a magnetic encoder, the encoder can be bonded to the retainer as one counter-measure for the above-mentioned creep. Instead of this bonding, protrusions and recesses can be formed on the outer diameter surface of the encoder so that they bite the inner diameter surface of the retainer, thereby preventing the encoder from rotating when the encoder is pressed in. Thus in the rotation sensor unit according to the fifth arrangement, the encoder is retained by the retaining portion and prevented from rotating by creep when the encoder is pressed in the retaining portion made of a synthetic resin. This makes the assembly process simpler compared to bonding with adhesive.

In the rotation sensor unit according to a sixth arrangement, the protrusions and recesses are symmetric with respect to the axis of the encoder.

In the rotation sensor unit according to the sixth arrangement, the encoder is protruded and recessed symmetrically with respect to the axis of the encoder, radial distribution of flux from the encoder is symmetrical with respect to the axis of the encoder, which prevents negative influence to the detection accuracy caused by a protruded and recessed configuration.

In the rotation sensor unit according to a seventh arrangement, the encoder is a plastic magnet formed by integral injection molding.

In the rotation sensor unit according to the seventh arrangement, the above-mentioned protrusions and recesses are formed simultaneously when the encoder is molded, and there is no need for forming the protrusions and recesses in an extra post-processing step.

DETAILED DESCRIPTION OF THE PREFERRED EMBODIMENTS

Figure 1:
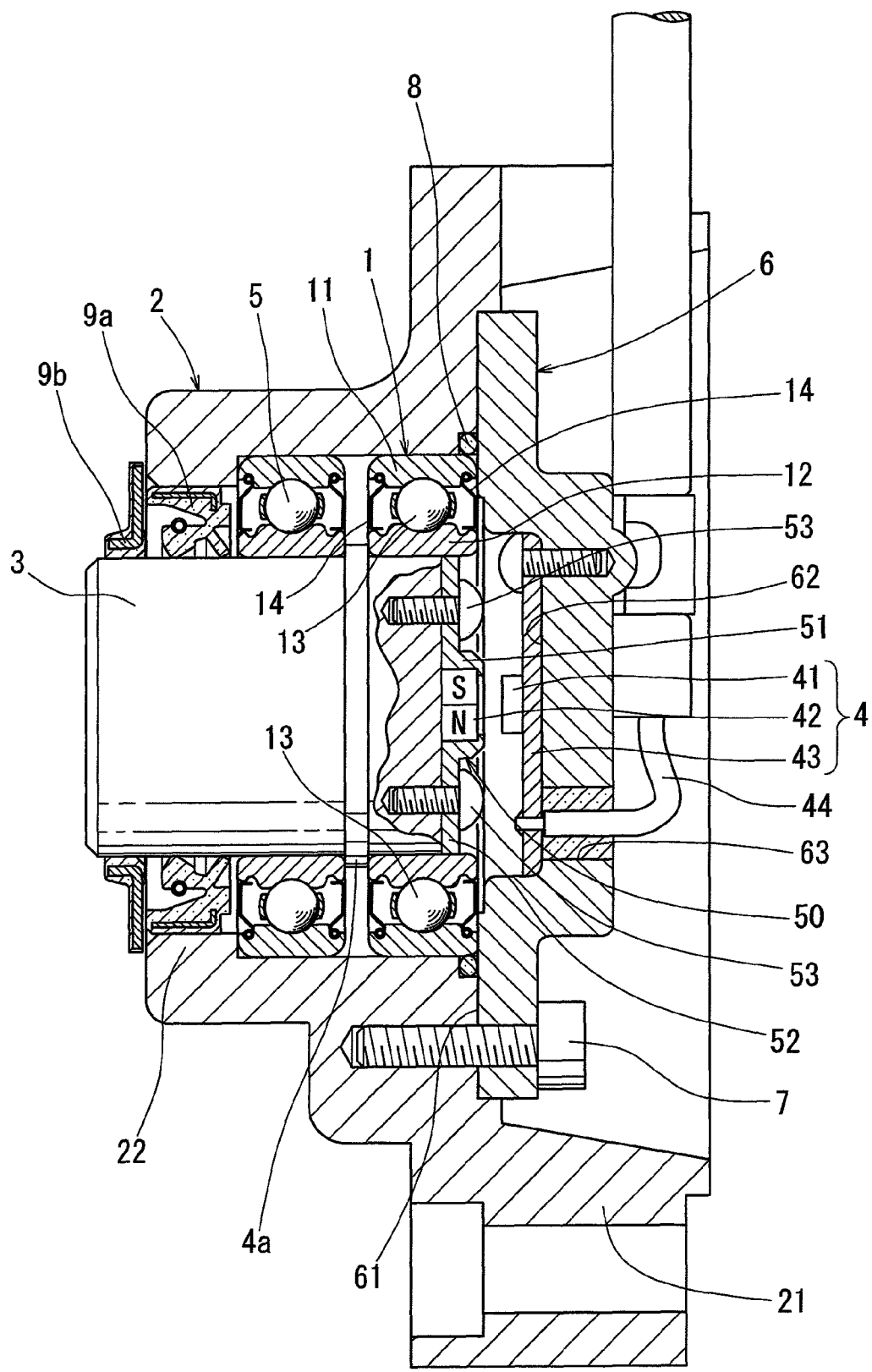
FIG. 1 is an entire sectional view of Embodiment 1.

The following is a description of a rotation sensor unit according to Embodiment 1 (hereafter simply referred to as "Embodiment 1") with reference to FIG. 1, which shows the entire configuration of Embodiment 1 in axial section. As shown in FIG. 1, Embodiment 1 includes a first rolling bearing 1 having an outer race 11, a housing 2 supported on the outer race 11 of the rolling bearing 1, a shaft 3 supported by the rolling bearing 1, and a magnetic encoder 4 for detecting rotation of the shaft 3.

A second rolling bearing 5 is mounted between the housing 2 and the shaft 3, forming a duplex bearing in cooperation with the first rolling bearing 1. The rolling bearings 1 and 5 are both sealed ball bearings.

The housing 2 has a mounting flange 21 on its outer periphery. The assembled rotation sensor unit can be attached to a housing of an external device by bolting the flange 21 thereto.

Embodiment 1 is protected from external forces by a protection cover, or used under such a working condition that the housing 2 will not be broken by external force. The housing 2 is therefore formed by integral injection molding of a resin for weight saving and formability rather than for strength. But the housing 2 may be made of aluminum, instead.

The shaft 3, the outer race 11 and an inner race 12 of the rolling bearing 1, and rolling elements 13 provided between the races 11 and 12 are made of soft magnetic materials. Ferric soft magnetic materials may be used for these members, and paramagnetic materials are preferred to prevent members such as the shaft 3 from being magnetized.

Each seal 14 of the first rolling bearing 1 has a shield plate portion extending from the attachment end that is pressed into a seal groove of the outer race 11 to the opposite end. The shield plate portion of each seal 14 is made of a soft magnetic material. Flux of the external magnetic field therefore cannot pass through the shield plate portion of each seal 14. For the material of the shield plate portion of each seal 14, for example, a soft magnetic stainless steel plate may be used.

A bearing mounting slot formed in a first side end of the housing 2 is covered with a lid 6 pressed in the axial direction against the first side end of the housing 2. The lid 6 includes an outer circumferential portion 61 pressed in the axial direction against the first ends of the housing 2 and the outer race 11 and a recessed portion 62 covering the first ends of the shaft 3 and the inner race 12 and recessed axially from the plane of the second side of the outer circumferential portion 61. The lid 6 is fixed in position with its outer circumferential portion 61 fastened to the housing 2 with bolts 7. In this state, the recessed portion 62 of the lid 6 axially faces the first side end of the shaft 3, and a space to receive the magnetic encoder 4 is defined between the lid 6 and the first end of the shaft 3.

Considering the above-mentioned working condition, formability is more emphasized than strength and a cold-rolled steel plate is used for the lid 6. A rolled steel material for general structure may be used for the lid 6.

The inner race 12 is fitted so that its one end protrudes from the first end of the shaft 3. Accordingly, the outer race 11, which is of the same width as the inner race 12, also protrudes from the end of the outer circumferential surface of the shaft 3. When the outer circumferential portion 61 of the lid 6 is pressed against the housing 2 with the bolts 7, the end of the outer race 12 of the first rolling bearing 1 on the first side is pushed axially toward the second side by the outer circumferential portion 61 of the lid 6. As a result, a position preload is given to the bearings 1 and 5 by a shoulder 22 of the housing 2, a spacer 4a of the shaft 3 and the lid 6. This increases rigidity of the bearings 1 and 5, and thus prevents run-out of the shaft 3. The rolling bearing 1 is not limited to the particular configuration as long as it is the type used with a preload.

The second end of the shaft 3 protrudes from a shaft hole formed in the second end of the housing 2 so that the shaft 3 can be coupled with a shaft of an external device.

The gap between the outer circumferential portion 61 of the lid 6 and the housing 2 is sealed with a packing 8. The clearance between the shaft hole of the housing 2 and the shaft 3 is sealed with an oil seal 9a and a slinger 9b.

The magnetic encoder 4 comprises a magnetism detection element 41, an encoder 42 and a circuit board 43 on which the magnetism detection element 41 is mounted. For the magnetic encoder 4, a known device may be used to measure the rotational angle, position or speed of the shaft 3 or the number of rotations of the shaft 3. The encoder 42 is provided so that it rotates coaxially and integrally with the shaft 3. The magnetism detection element 41 is provided so that its magnetism sensing surface axially faces the encoder 42.

Specifically, the magnetism detection element 41 detects change of flux of two phases that have 90° difference and calculates the rotation angle.

The encoder 42 is a magnet having south and north poles provided alternately in the circumferential direction around the axis (hereafter simply referred to as "the circumferential direction"). The encoder 42 shown entirely consists of a magnet having a south pole that takes up half of the circumference and a north pole that takes up the rest of the circumference. The encoder 42 is however not limited to this particular type as long as it can encode predetermined physical values related to rotation of the shaft 3 with desired accuracy. For example, the encoder 42 may be a multipolar magnet with a plurality of south poles and north poles.

The magnetism detection element 41 is supported by the lid 6 as the circuit board 43 is fixed to the bottom of the recessed portion 62 of the lid 6. The radial plane of the recessed portion 62 supports the surface of the circuit board 43 to position the magnetism detection element 41 in the axial direction. The circuit board 43 is screwed to the recessed portion 62 of the lid 6 and insulated from the lid 6.

Embodiment 1 further includes a holder 50 that radially positions the encoder 42.

The holder 50 is formed by integral injection molding of a synthetic resin, and thus the entire holder 50 is non-magnetic.

The holder 50 comprises a retaining portion 51 in which the encoder 42 is axially fitted, radially positioning the encoder 42, and a screwed portion 52 that extends between the retaining portion 51 and the inner diameter surface of the inner race 12.

The retaining portion 51 is cylindrical, is fitted around the encoder 42, and has an inner flange that prevents the encoder 42 from coming off from the first side. The retaining portion 51 is formed so that the magnetic poles of the encoder 42 are open to the magnetism sensing surface of the magnetism detection element 41. The retaining portion 51 therefore does not extend into the clearance between the magnetism detection element 41 and the encoder 42, and this makes it possible to configure the above-mentioned clearance to be of a desired axial dimension and to make the clearance compact. The second side of the retaining portion 51 is open so that the encoder 42 can be inserted from this side. The encoder 42 is bonded to the retaining portion 51 so that it does not rotate.

The screwed portion 52 is disk-shaped, extending radially outwardly from the retaining portion 51. The screwed portion 52 is fitted in the inner race 12 on the first side. In this state, the encoder 42 is positioned coaxially with the shaft 3. The encoder 42 and the holder 50 contact the end face of the shaft 3 on the first side at this time. The second side of the encoder 42 is positioned by the first end of the shaft 3. The encoder 42 and the holder 50 are formed so that their centers coincide with the axis of the shaft 3 when they are fitted as described above.

Thus in Embodiment 1, the encoder 42 can be positioned coaxially with the shaft 3 without forming a hole in the shaft 3 to fit the encoder 42 therein.

The screwed portion 52 does not need to be disk-shaped, and it can be any desired shape as long as it enables the above-mentioned positioning. For example, the screwed portion 52 may comprise a plurality of arcuate portions provided at equal intervals around the retaining portion 51. Also cutouts and holes may be formed in the screwed portion 52.

With the holder 50 fitted as described above, the screwed portion 52 is fastened to the first end of the shaft 3 with screw members 53 to fix the holder 50 to the shaft 3. In this state, the encoder 42 is located nearer to the magnetism detection element 41 than is the first end of the shaft 3. This prevents flux from the encoder 42 to the magnetism detection element 41 from being caught by the shaft 3 even when the shaft 3 is made of a magnetic material.

While the end face of the shaft 3 on the first side is a radial flat surface for simplicity, it may have features such as a recess for the purpose other than positioning of the encoder 42. If the end face of the shaft 3 on the first side is a radial flat surface, the radial width of the space between the encoder 42 and the inner diameter surface of the inner race 12 can be extended to the maximum without forming a recess in the shaft 3 or in the inner race 12 when the first end of the inner diameter surface of the inner race 12 protrudes from the first end of the outer diameter surface of the shaft 3. The space for the screwed portion 52 and the screw members 53 can be kept most efficiently between the shaft 3 and the lid 6.

Since the retaining portion 51 is made of a non-magnetic material, flux from the encoder 42 to the magnetism detection element 41 is not caught by the retaining portion 51.

The screw members 53 are also made of a non-magnetic material. Thus, flux from the encoder 42 to the magnetism detection element 41 is not caught by the screwed portion 52 or the screw members 53 either.

As described above, when the encoder 42 is fixed to the shaft 3 and the lid 6 with the circuit board 43 fixed therein is pressed against the first end of the housing 2 with the bolts 7, a first phase element and a second phase element of the magnetism detection element 41 are fixed to the respective positions facing the polarized surface of the encoder 42, with 90° of phase difference provided between these two phase elements. In other words, the encoder 42 is positioned on the shaft 3 with the run-out of the shaft 3 prevented, and the magnetism detection element 41 is positioned on the lid 6, which is pressed against the housing 2. This prevents relative displacement between the magnetism detection element 41 and the encoder 42.

Wiring 44 of the circuit board 43 extends through a hole 63 formed in the recessed portion 62 to the outside. The hole 63 is plugged with a filler. The filler cannot be a magnetic material for the sake of insulation of the circuit board 43. A magnetic shield may be provided in the hole 63 by laminating an extra filler mixed with magnetic particles after placing an insulating filler in the hole 63.

When a preload is given to the rolling bearings 1 and 5 by pressing the lid 6, the outer circumferential portion 61 and the outer race 11 are kept in contact with each other over the entire circumference. The space defined between the recessed portion 62 of the lid 6 and the first end of the shaft 3 is surrounded by the outer circumferential portion 61 of the lid 6 and the outer race 11. This space is magnetically shielded except for the area where flux from the external magnetic field comes in through the hole 63 of the lid 6. The magnetism detection element 41 is provided in this magnetically shielded space. Thus in Embodiment 1, the above-mentioned magnetically shielded space is formed, utilizing the lid 6, which is required for preloading, the shaft 3 and the outer race 11, which are essential elements for the rotation sensor unit. The magnetism detection element 41 is thus shielded from an external magnetic field without relying on the housing 2 or an additional magnetic shield cover.

Flux of the external magnetic field coming in the axial direction from the second side to the rolling bearing 1 can come into the annular space between the outer race 11 and the inner race 12 with an inclination angle toward the second side with respect to the radial plane. If e.g., the inner race 12 is made of a non-magnetic material, it is highly probable that the flux passes through this non-magnetic member and directly comes into the space between the first end of the shaft 3 and the lid 6. While this invasion of flux can be prevented by widening the outer race 11, it is not preferable since the widened outer race 11 adds extra weight. Using magnetic materials for members such as the inner race 12 and the shield plate of the seal 14, flux of the external magnetic field coming in axial direction from the second side to the rolling bearing 1 is caught by the inner race or by the shield plate of the seal 14. Even if the flux comes into the inner space of the rolling bearing 1 through the slight clearance between the seal 14 and the inner race 12, the flux is caught by the inner race 12 since the clearance of the seal 14, which is made of a magnetic material, is adjacent to the shoulder of the inner race 12. Therefore, flux of the external magnetic field cannot penetrate the rolling bearing 1 into the space between the lid 6 and the first end of the shaft 3, and this makes it possible to secure a wider magnetically shielded space.

If the rolling elements 13 as well as the inner race 12 are made of a non-magnetic material, flux caught by the rolling elements 13 is detoured to the outer race 11 and the inner race 12 since the rolling elements 13, the outer race 11 and the inner race 12 are kept in contact with each other by preload to the rolling bearing 1. Using magnetic materials for the inner race 12 and the rolling elements 13, flux of the external magnetic field can be caught by the inner race 12, and it becomes difficult for the external flux to penetrate the rolling bearing 1 into the space between the lid 6 and the first end of the shaft 3. This makes it possible to secure a wider magnetically shielded space and to adopt an inner race 12 or other components of a standard type as they are.

Even if the seal 14 is omitted, or if the shield plate of the seal 14 is non-magnetic, flux from the external magnetic field coming into the space between the outer race 11 and the inner race 12, being inclined relative to the radial plane, can be caught by the inner race 12 or the revolving rolling elements 13 and cannot come into the space between the lid 6 and the first end of the shaft 3 if the inner race 12 and the rolling elements 13 are made of magnetic materials. Flux of the external magnetic field that passes through the space between the outer race 11 and the inner race 12 in the axial direction may pass between the revolving rolling elements 13. However, this flux directly comes into the lid 6 and does not come into the space between the lid 6 and the first end of the shaft 3.

Also if the housing 2 is made of a soft magnetic material, many through holes can be formed in the housing 2 to reduce weight. This is because the magnetically shielded space can be defined with the lid 6, the shaft 3 and the outer race 11 independently of locations of such through holes.

The shaft 3, the lid 6, the outer race 11 and the inner race 12 do not necessarily have to be made of the same magnetic material. Different magnetic materials that are most suitable for respective members may be used. Among such suitable magnetic materials are iron, silicon steel, permalloy, sendust, permendur and soft ferrite.

As described above, in Embodiment 1, the magnetically shielded space can be formed independently of the housing 2.

Therefore the housing 2 may be made of either magnetic or non-magnetic material, and the housing 2 may be either sealed or open.

Weight of the housing 2 can be significantly reduced if it is made of synthetic resin or aluminum (including an aluminum alloy). While the housing 2 and the lid 6 are generally made of the same material, magnetic materials are heavier than synthetic resin and aluminum. By making the lid 6 with a magnetic material while using synthetic resin or aluminum for the housing 2, it is possible to form the above-mentioned magnetically shielded space while reducing the weight of the rotation sensor unit.

The housing 2 can be made of synthetic resin or aluminum if no large external force acts on the housing. In such a case, there is no need for using high strength high carbon steel as a magnetic material forming the lid 6. Thus, the lid 6 can be formed with a cold-rolled steel plate or a rolled steel for general structure, which increases formability of the lid 6.

A preload may be applied through an endless annular spacer 4a provided between the lid 6 and the outer race 11 by pressing the lid 6 in the axial direction against the first end of the outer race 11. When pressing the first end of the outer race 11 directly with the lid 6, the space obtained between the lid 6 and the first end of the shaft 3 is limited and it is difficult to define a sufficient amount of the above-mentioned magnetically shielded space if the second side of the lid 6 and the first end of the shaft 3 are formed parallel to each other. In this case, to expand the space between the lid 6 and the first end of the shaft 3, a recess similar to the recessed portion 62 extending the distance between two facing surfaces can be formed in at least one of the lid 6 and the first end of the shaft 3. Alternatively, to save labor of forming a recess in the second side of the lid 6 or the first end of the shaft 3, a spacer ring made of a magnetic material may be provided between the first end of the outer race 11 and the lid 6. This extends the distance between the second side of the lid 6 and the first end of the shaft 3 and thus expands the above-mentioned space. In this case, the second end of the lid 6 and the first end of the shaft 3 may be simply formed flat and it saves labor of forming.

Figure 2A:
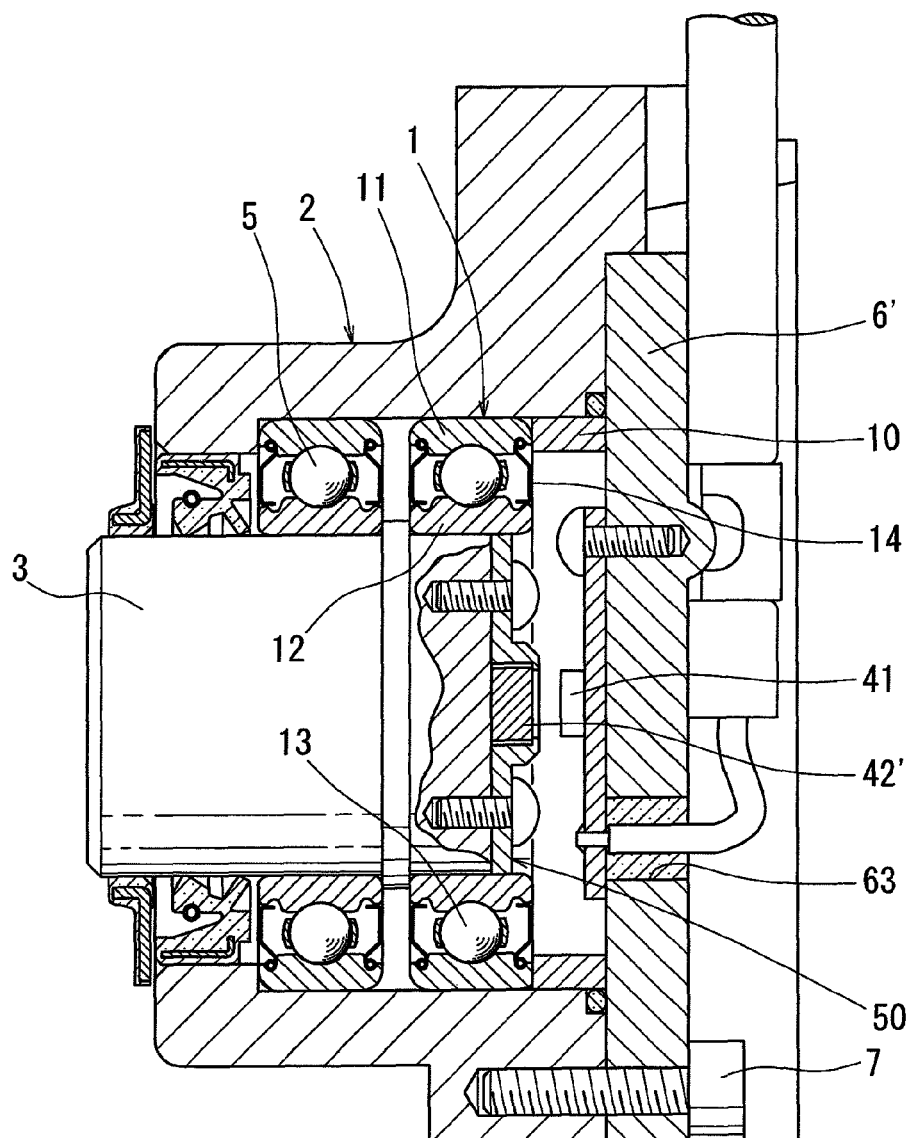
FIG. 2A is an entire sectional view of Embodiment 2.
Figure 2B:
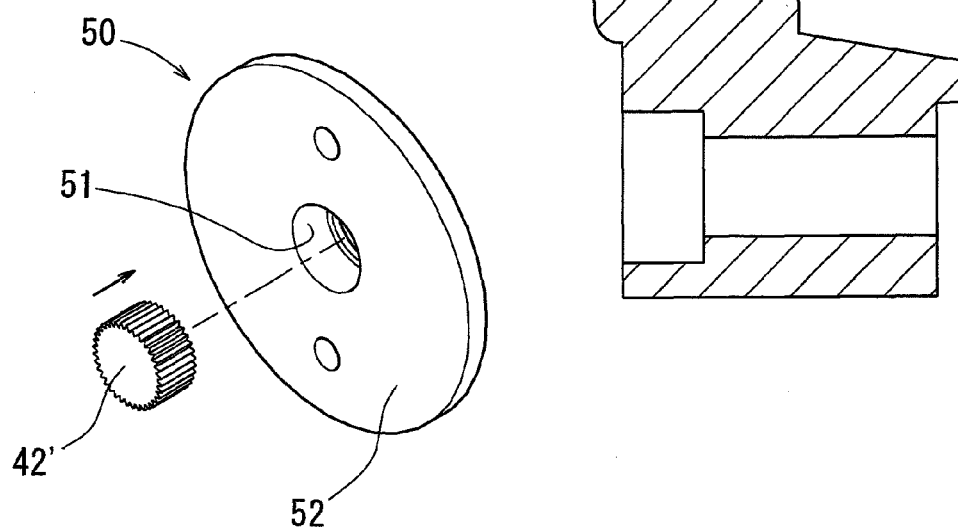
FIG. 2B is an exploded perspective view of the holder of FIG. 2A.

As an example of the above-mentioned configuration, a rotation sensor unit according to Embodiment 2 of this invention (hereafter simply referred to as "Embodiment 2") is described below, with reference to FIGS. 2A and 2B. In the following description, differences from Embodiment 1 are mainly described and description of common features is omitted.

An encoder 42' of Embodiment 2 is retained, pressed in the inner diameter surface of the retaining portion 51. On the outer diameter surface of the encoder 42', protrusions and recesses are formed so that the outer diameter surface of the encoder 42' bites into the inner diameter surface of the retaining portion 51 and the encoder 42' does not rotate relative to the retaining portion 51. Thus in Embodiment 2, the encoder 42' is pressed in and retained by the retaining portion 51 made of synthetic resin, which creeps around the above-mentioned protrusions and recesses and locks the encoder 42' so that the encoder 42' does not rotate. This makes the assembly of Embodiment 2 easier than Embodiment 1, which uses adhesive to fix the encoder 42. Such protrusions and recesses may be used in Embodiment 1, too.

The above-mentioned protrusions and recesses are knurls that are symmetric with respect to the axis of the encoder. In Embodiment 2, since the knurls are symmetric relative to the axis of the encoder, radial distribution of flux from the encoder 42' can also be formed symmetrically relative to the axis of the encoder. This prevents negative influence on the detection accuracy caused by protruded and recessed configuration of the encoder 42'. The protrusions and recesses are not limited to knurls and they can be of any convenient forms, e.g. grid-like cuts, considering factors such as the above-mentioned locking effect and uniform flux distribution.

The encoder 42' should be a plastic magnet formed by integral injection molding. In Embodiment 2, the above-mentioned protrusions and recesses are formed simultaneously when the encoder 42' is molded, and there is no need for forming the protrusions and recesses in an extra post-processing step. The plastic magnet is made of a plastic binder mixed with magnetic particles, and injection-molded into a desired shape.

In Embodiment 2, the second side of the lid 6' is formed into a single radial plane, which makes the forming of the lid 6' easier.

A spacer ring 10 is provided between the second side of the lid 6' and the first side of the outer race 11. The spacer ring 10 is endless and annular, having an outer circumference fitted in the housing 2. The second side surface of the spacer ring 10 is axially butted to the first side surface of the outer race 11 over the entire circumference and the second side of the lid 6' is axially butted to the first side surface of the spacer ring 10 over the entire circumference. This keeps the space to provide the magnetism detection element 41 while the first end of the shaft 3 and the second side of the lid 6' are formed into radial planes.

When the lid 6' is pressed against the housing 2, the spacer ring 10 is pressed in, and the outer race 11 is pressed by the lid 6' via the spacer ring 10. This gives position preload to the rolling bearings 1 and 5. In this state, the spacer ring 10 surrounds the space between the lid 6' and the first end of the shaft 3. The spacer ring is made of a magnetic material. Thus in Embodiment 2, the magnetically shielded space can be defined with the lid 6', the shaft 3 and the spacer ring 10 while forming of the lid 6' is made easy. The spacer ring 10 is required for preloading the rolling bearing 1. Therefore, in Embodiment 2 too, the magnetism detection element 41 is shielded from the external magnetic field without relying on the housing 2 or an additional magnetic shield cover.

What is claimed is:

1. A rotation sensor unit comprising a rolling bearing having an outer race and an inner race, a housing in which said outer race of said rolling bearing is fitted, a shaft supported by said rolling bearing, a magnetic encoder for detecting rotation of said shaft, said magnetic encoder having an encoder and a magnetism detection element, said encoder being a magnet comprising north and south poles provided alternately in a circumferential direction around an axis of said shaft and rotatable coaxially and integrally with said shaft, said magnetism detection element axially facing said encoder, and a holder provided to position said encoder radially;

wherein said inner race of said rolling bearing has an inner diameter surface fitted around said shaft with one end of said inner race protruding from a first end of an outer diameter surface of said shaft, wherein said encoder is positioned coaxially with said shaft by fitting said holder to said inner diameter surface of said inner race at said one end of said inner race;

wherein said holder is made of a non-magnetic material; and wherein said holder comprises a retaining portion that retains said encoder and a screwed portion that extends between said retaining portion and the inner diameter surface of said inner race at said one end of said inner race, and wherein said screwed portion and said shaft are fixed to each other with non-magnetic screw members.

2. The rotation sensor unit according to claim 1, wherein said encoder is fixed in a position between said magnetism detection element and said first end of said shaft.

3. The rotation sensor unit according to claim 2, further comprising a lid closing an open end of a bearing mounting slot of said housing, wherein said lid is pressed axially against said outer race to apply a preload to said bearing, wherein said magnetism detection element is positioned on said lid on the side facing said first end of said shaft, wherein said lid, said shaft and said outer race are made of magnetic materials, and wherein said magnetism detection element is provided in a magnetically shielded space defined by said lid, the first end of said shaft, and said outer race.

4. The rotation sensor unit according to claim 1, wherein said holder is made of a synthetic resin and retained by being pressed in an inner diameter surface of said retaining portion, protrusions and recesses being formed on an outer diameter surface of said encoder so as to bite the inner diameter surface of said retaining portion to prevent said encoder from rotating relative to said holder.

5. The rotation sensor unit according to claim 4, wherein said protrusions and recesses are symmetric with respect to an axis of said encoder.

6. The rotation sensor unit according to claims 4, wherein said encoder is a plastic magnet formed by integral injection molding.

* * * * *